Patented July 3, 1928.

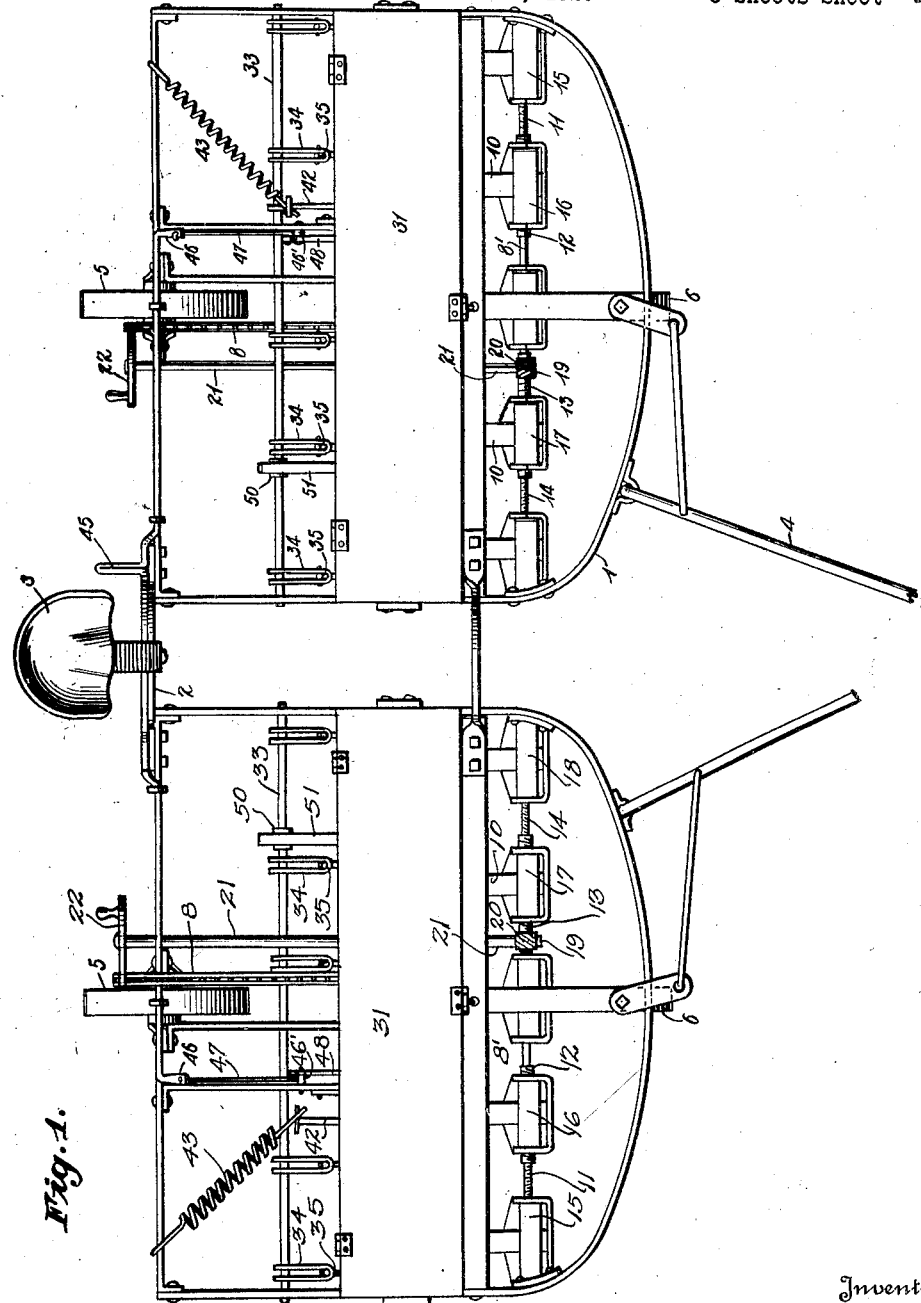

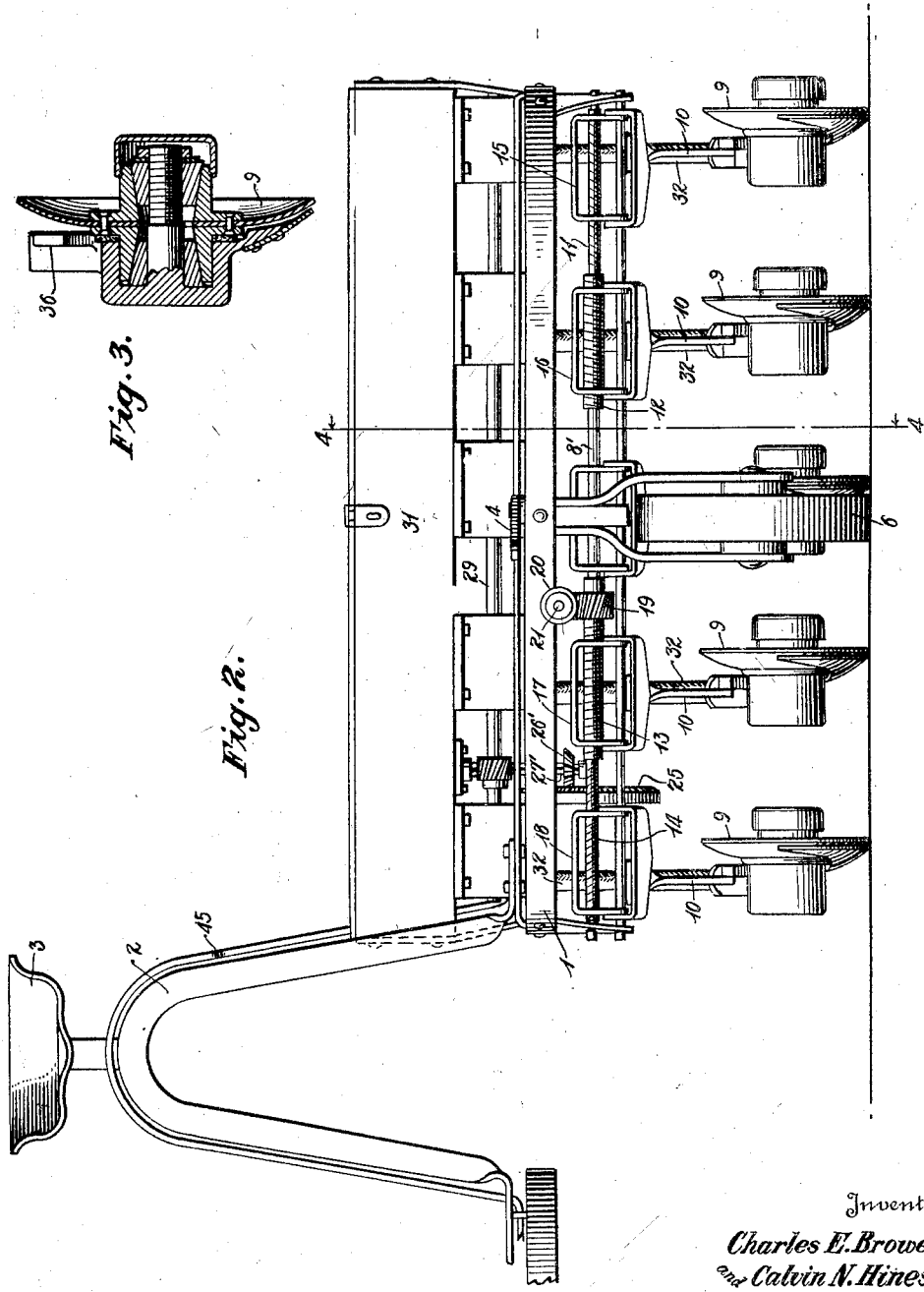

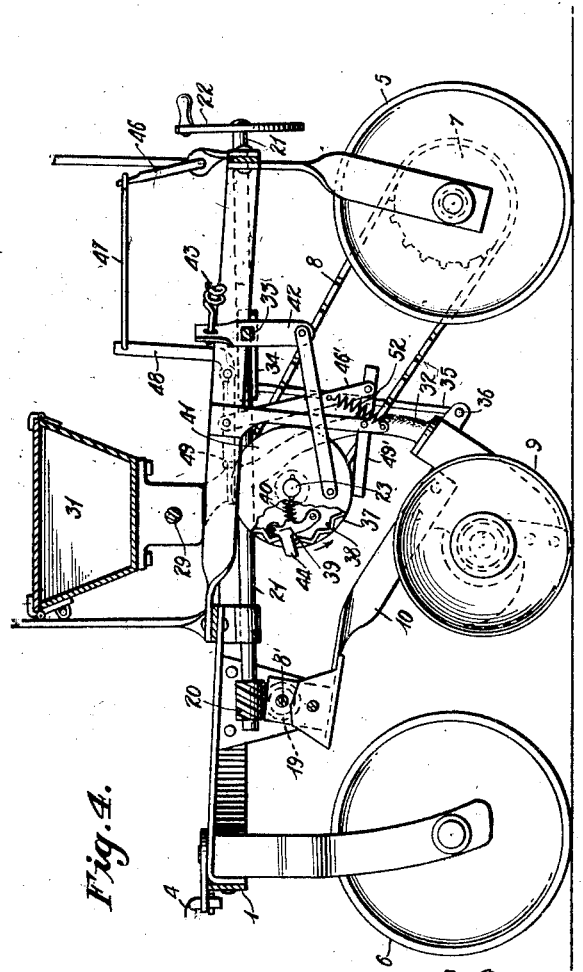

1,676,130

UNITED STATES PATENT OFFICE.

CHARLES E. BROWER AND CALVIN N. HINES, OF YUMA, COLORADO.

SEEDING MACHINE.

Application filed December 10, 1925. Serial No. 74,559.

This invention relates to a machine for sowing small grain between corn rows and the like.

An object of the invention is to provide a multiplicity of units containing the necessary sowing instrumentalities and to connect these units by an arch-shaped element to span the corn stalks between the adjacent rows.

A further object of the invention is to provide means whereby the disc plows for sowing the grain may be simultaneously adjusted in order that the width of the rows to be sowed may be readily changed.

A further object of the invention is to provide a power mechanism for operating the seed distributing apparatus and to also operate the disc plows to lift the same from the ground when desired.

A further object of the invention is to provide means whereby the seeding distributor drive is automatically disengaged upon the lifting of the plow discs from the ground.

Other and more detail objects of the invention will be apparent from the reading of the following specification in conjunction with the drawings attached hereto and forming a part hereof in which:

Figure 1 is a top plan view disclosing two units of the apparatus, but inasmuch as the mechanism of each unit is identical, there is disclosed in detail the mechanism for only one of the units.

Figure 2 is a front view of the apparatus disclosing the gearing mechanism by which the plow discs may be adjusted relatively to each other.

Figure 3 is a detail view of one of the plow discs.

Figure 4 is a side view partly in section of the apparatus.

Figure 5 is a longitudinal section of a part of the mechanism including the grain distributing means.

Figure 6 is a vertical sectional view of the mechanism for rotating the grain distributing shaft.

Referring now particularly to the drawings:

1 designates the frame; 2 the arch connecting the two frame units and adapted to overspan the corn; 3 the driver's seat; 4 the draft mechanism for propelling the device; 5 the rear wheel; and 6 the front wheel. It will be noted that the power is taken from the rear wheel by means of the sprocket 7 and sprocket chain 8 operating in a manner hereinafter set forth.

Preferably at the forward part of the machine is a shaft 8' for supporting the discs 9 by means of the hangers 10. This shaft is provided with a multiplicity of oppositely screw-threaded portions 11, 12, 13 and 14, the two outer portions being of relatively small diameter as compared with the two innermost screw-threaded portions 12 and 13. Cooperating with the screw-threaded portions of the shaft are stirrups 15, 16, 17 and 18 which are secured to hangers 10, which correspondingly are interiorly screw-threaded. These stirrups are for the purpose of supporting the discs 9. The shaft is also provided with a gear 19 which is held fast on the shaft. Cooperating with this gear is a gear 20 secured on the shaft 21 extending to the rear of the machine and provided with a rotating handle 22. It will be apparent from this mechanism that upon the rotation of the handle 22, the gear 20 cooperating with gear 19 will cause the rotation of the shaft 8', and likewise the rotation of the screw-threaded portions of said shaft which in turn will cause a relative movement of the seed boots which in turn are secured to the discs 9 to or away from each other. In other words, if the distance between the rows to be sowed is desired to be adjusted, this can be expeditiously accomplished by turning the handle 22, due to the formation of the right and left hand threads, and the discs will be clearly divided so that the grain will not be planted closer in some places than others. It is also desirable that the discs of the left handed unit and the disc of the right handed unit be oppositely disposed in order to throw the dirt away from the center between the two units during the planting operation.

The power wheel 5 through the sprocket chain 8, aforesaid, drives the shaft 23 through the sprocket connection with the gear wheel 24. Attached to this shaft is a gear 25 provided with a multiplicity of teeth. This gear wheel has associated therewith the spring 26 held in a state of compression by the collar 27 in order to normally urge the gear 25 toward an operating gear 26. This gear 26 drives the vertical shaft 27', which in turn drives another gear 28 to rotate the seed distributing shaft 29 provided with the conventional worm seed distributors 30 for dispensing the grain from the trough 31. Communicating with the distributing mechanism is the conduit 32 connected with the discs 9.

Mounted within the confines of the frame 1 is a supporting shaft 33 rotatably journalled at its ends in said frame 1. To this shaft are attached the members 34 in a non-rotative manner. These members 34 are in turn attached to the links 35 secured to the plow disc at 36. The members 34 are secured to the members 35 in any desired manner, the detailed construction of which constitutes no part of this invention, but by virtue of said connection a lifting movement may be imparted to the discs 9 by rotation of the shaft 33, and the resulting lifting movement of the element 34 which in turn lifts the member 35 attached to the plow 36, as evidenced, by means of a pivotal connection.

Secured to the said shaft 23, from which the seed distributing shaft is driven, is a cup-shaped element 37 provided with a cam runway 38. Cooperating with the cam runway 38 is a ratchet device 39 which is yieldably urged toward the cam runway by the spring 40. This ratchet device 39 is secured to the cooperating plate 41. Attached to this plate 41 is a linkage arrangement 42 which is journalled fast to the shaft 33 herein referred to. The spring 43 held in a state of compression by any suitable means normally is urged against the upper end of the link 42 in order to normally urge the shaft 33 in a counter-clockwise direction, and thus maintain the plow in its operative condition, through the plow lift elements 34 and 35, above referred to.

The ratchet device 39 is provided with an outwardly extending dog 44 which extends through the opening between the cup element 37 and the plate 41.

In order to prevent rotation of the plate 41, and thus maintain the plow either in its operative or inoperative position, there is provided a hand or foot mechanism 45 situated in proximity to the driver's seat. A depression of this member 45 will cause a rotation thereof and a consequent movement of the member 46, the connecting member 47 and the bell crank 48. The outer extremity of the bell crank 48 terminates in a stop 49 for engaging the dog 44 in a manner hereinafter described. Attached to the bell crank is the connecting link 46' whereby the movement of the bell crank 48 will be transmitted to a second stop device 49'.

Connected to the shaft 33 is a cam 50 engaging the shift lever 51, to move the gear 25 laterally against the tension of the spring 26 and out of engagement with the seed distributing stub shaft gear 26'. In other words, upon the rotation of the shaft 33, in a manner hereinafter set forth, the cam 50 bears against the shift device 51 to disengage the gear from the stub shaft gear 26' and render the seating mechanism inoperative when the shaft is rotated in a manner to lift the plows up out of the ground.

Now referring to the operation of the lifting mechanism, it will be noted that the rotation of the shaft 23 caused by the sprocket connections 7 and 8, with the rear wheel, will cause the driving of the seed distributing mechanism when the gears are in position, and will simultaneously rotate the cup 37. This rotation of the cup will also cause the rotation of the plate 41 and consequently move the plow lifting shaft 33 through the linkage arrangement 42 secured to the plate 41. However, when the dog 44 carried by the sprocket arrives at the position where it abuts against the stop device 49, it will cause a slip ratchet movement of the device 39, and thus prevent a rotation of the plate 41. In this position, the plows are maintained in the earth by means of the connections 34 and 35 which are operatively and rigidly associated with the shaft 33. If, however, the occupant of the machine desires to lift the plow out of the ground, he depresses the pedal 45 which causes the stops 49 and 49' to spread apart and clear the dog 44 with the result that the plate 41 is now operative and causes a rotation of the shaft 33 and a consequent lifting of the plows. Upon a release of the pedal 45, the stops 49 and 49' are again urged together by means of the spring 52, and thus maintained in their operative position. Upon a further movement of the dog 44, it is again arrested by the upper stop 49 at about approximately a half revolution, which upper stop holds the ratchet through its engagement with the dog, and consequently prevents a further rotation of the plate 41 with the result that the plow is maintained in its upright position until the dog is again released by a depression of the foot pedal 45 and the consequent moving of the plate 41 to a position where it is engaged by the lower stop 49'. As hereinbefore stated, the rotation of the shaft 33 in a manner to lift the plows out of the ground automatically disengages the feed mechanism by sliding the gear 25 laterally out of mesh with the gear 26'.

From the above, it will be understood that we have provided a simple mechanism whereby the rotation of the handle 22 will effect a separation of the plow disc to the desired extent through the right and left handed screw thread connection, and in accordance with the exigencies of the particular occasion. Further power derived from the rear wheel engaging the ground will simultaneously cause the seed distributing mechanism to be brought into play as well as rotating the cup 37 which in conjunction with its associated instrumentalities will cause a lifting or lowering of the plow by the common power source consisting of the wheel 5 and the rotation of the shaft 23.

Having thus described our invention, what we claim as new is:

1. In a device of the class described, the combination with a frame and shaft therefor, said shaft being provided with a plurality of reversely situated screw threads, stirrups having interior cooperating screw threads mounted on said shaft, planting devices being operatively connected with said stirrups, and means for rotating said shaft to thereby cause a longitudinal movement of the stirrups and the planting devices to uniformly vary the space between the planting devices.

2. In a mechanism of the character described, the combination with a frame and a shaft therefor, said shaft being provided with a plurality of reversely formed screw-threaded portions, several of said threaded portions being of differential sizes as compared with the remaining threaded portions, stirrups having interior correspondingly screw-threaded threads mounted on said shaft, planting devices operatively connected with said stirrups, and means for rotating said shaft to cause a longitudinal movement of the stirrups and the planting devices attached thereto, to cause, by said threaded portions, a longitudinal movement of the planting devices and the stirrups to uniformly vary the space between the planting devices.

In testimony whereof we affix our signatures.

CHARLES E. BROWER.
CALVIN N. HINES.